Patented Mar. 16, 1937

2,073,662

UNITED STATES PATENT OFFICE 2,073,662

COLOR COMPOUND

John M. Tinker, South Milwaukee, and Viktor M. Weinmayr, Milwaukee, Wis., assignors to E. I. du Pont de Nemours & Company, Wilmington, Del., a corporation of Delaware No Drawing. Application November 21, 1934
Serial No. 754,085

14 Claims. (Cl. 260—61)

This invention relates to the preparation of new compounds particularly suitable for the coloring of hydrocarbon oils and hydrocarbon type solvents.

The object of this invention is to prepare color compounds which are suitable for coloring oils and other organic solvents and which will impart to such oils a strong fluorescence.

A further object of this invention is to produce new compounds which impart to oils a strong fluorescence in a great variety of shades, whereby it is possible to impart to those hydrocarbon fractions the fluorescence or bloom by which they were originally characterized, when their color and fluorescence has been changed or destroyed during the distillation or chemical treatments to which they were subjected for putting them in the proper form for commercial use.

A still further object is to produce color compounds which are suitable for imparting desirable fluorescence to oils which will be stable to light and heat, so that the oil does not lose its fluorescence under the conditions to which it is generally subjected in its use.

A still further object of the invention is to produce compounds that may also be useful as intermediates for the preparation of dyes.

We have found that when polynuclear aromatic ketones of the anthraquinone series, such as anthraquinone, benzanthrone and anthanthrone, or their methyl or halogen derivatives, or mixtures of one or more of these compounds, are heated to temperatures above about 280° C. with a reducing metal, for example, iron, zinc, tin, nickel, lead, etc., and if desired in the presence of high boiling solvents, color compounds are produced which when dissolved in oils or other hydrocarbon type solvents impart thereto a strong fluorescence ranging from blue-green to orange and red shades.

The formation of these color bodies begins at temperatures of around 280° C., with optimum results being obtained at temperatures between 300 and 360° C., the upper limit being fixed by the temperature at which decomposition of the compound takes place under the particular conditions used.

We have found that high boiling solvents may also be employed in the reaction, and that the solvents and the particular temperature at which the reaction is carried out modify to some extent the shade of the resulting product. Those high boiling solvents which boil above 280° C. in general are suitable so long as they do not enter into the reaction to materially alter the formation of the desired color compound. High boiling compounds such as benzophenone, abietane, abietene, benzoyl-2-benzoic acid and the chloro- and/or methyl-substituted benzoyl-2-benzoic acids have been found to operate satisfactorily as solvents in this reaction. The benzoyl-benzoic acid compounds are, in part at least, converted to benzophenone under the conditions of this reaction, but this conversion does not appear to have an appreciable effect on the preparation of the color compound, so far as we can determine. A slight change in shades of the products obtained when various solvents are used is believed to be the result of the physical conditions of the reaction and not due to any combination of the solvent with the anthraquinone body. The reaction may also be carried out with lower boiling solvents where elevated pressure is used.

Any of the metals which under the conditions of the reaction will effect a reduction of the anthraquinone compounds may be employed, such as zinc, iron, nickel, tin, lead, etc.; and for convenience these metals will be referred to as reducing metals.

The following examples are given to more fully illustrate our invention. The parts used are by weight.

Example 1

100 parts of benzanthrone are melted and heated to 250° C. 80 parts of iron powder are added to the benzanthrone at this temperature under agitation. The mass is now slowly heated to 300–350° C. and held there for 20 hours. The black reaction mass is poured onto pans to cool and milled fine after cooling. It is extracted with hot benzene in which the product is soluble with a yellow brown color. 90 parts of a light brown powder are obtained when the benzene is distilled off or removed with steam. This product imparts to hydrocarbon oils a strong green fluorescence when added in small amounts. A crude benzanthrone, containing large amounts of solvent insoluble material, can be used in place of a more pure benzanthrone without affecting the characteristic fluorescence of the resulting compound.

Example 2

120 parts of benzanthrone are heated to about 250° with 80 parts of benzophenone, and 100 parts of iron powder are added at this temperature. The mass is then heated to the reflux temperature of the benzophenone and held there for about 20 hours. Some of the benzophenone may be recovered by raising the temperature above its boiling point. The recovered benzophenone may be used for subsequent preparations without further purification. The resulting compound may be isolated in the manner described in Example 1, or the mass can be cooled almost to its melting point and a high boiling solvent, such as dichlorobenzene or trichlorobenzene, can be added. The green bloom producing agent dissolved in these solvents is then isolated by distilling off the solvent. The product shows a light green fluorescence in hydrocarbon oils.

Example 3

150 parts of benzanthrone, 50 parts of benzoyl-2-benzoic acid, and 100 parts of abietene obtained from rosin are heated to 230° C. 100 parts of tin are added while the temperature is slowly raised to 320–340°. The fluorescent product formed, which is of a slightly more olive shade than the products of the previous examples, can be isolated by any of the methods described in previous examples.

Abietane may be used in place of abietene and substituted benzoyl-2-benzoic acids, such as the methyl or chloro substituted benzoyl-2-benzoic acids, may be employed.

Example 4

750 parts of benzanthrone and 250 parts of benzoyl-2-benzoic acid are heated to about 250° C. and 650 parts of iron powder are slowly added at this temperature. The mixture is then heated to 320–330° C. for about 24 hours. Some dark colored oil formed during the reaction may be distilled off. The charge is worked up as described in the previous examples. The compound, which imparts to liquid hydrocarbons a strong green fluorescence, is very soluble in organic solvents, such as benzene, gasoline, kerosene, paraffin oil, pyridine, and others, showing bright green fluorescence in dilute solutions. It is sparingly soluble in alcohol, acetic acid, and acetic anhydride. The product, when isolated as described above, has a melting point of about 198–210° C. A combustion shows it contains 94.65% carbon and 5.3% hydrogen. It has a melting point of 239–249° C. after two crystallizations from pyridine, and analyzes 95.3% carbon and 4.26% hydrogen. The purified product has the same fluorescence as the crude product. It is soluble in cold sulfuric acid with blue color and red fluorescence. It can easily be oxidized to vat dyes. Compounds with similar green fluorescence can be obtained from other benzanthrones, and other benzoyl-2-benzoic acids may be used as the solvents, as illustrated by the following examples.

Example 5

75 parts of 2-methyl-benzanthrone and 40 parts of iron powder are heated to 300° C. for several hours. A product which exhibits a yellow-green fluorescence in solvents and hydrocarbon oils is obtained by extracting the crude fusion mass obtained.

Example 6

50 parts of Bzl-chloro-benzanthrone, 20 parts of benzoyl-2-benzoic acid, and 40 parts of iron are heated to 310° C. for a few hours. A product showing a yellow-green bloom in solvents and hydrocarbon oils can be isolated in the manner above described.

Example 7

150 parts of benzanthrone, 50 parts of alpha-naphthoyl-2-benzoic acid and 75 parts of iron powder are heated to 300–330° C. for 24 hours. The finished reaction mass is cooled to about 200° C. and ortho-dichlorobenzene is added to it. The whole is then extracted with dichlorobenzene and the product is isolated by steam distilling off the solvent. A product exhibiting a yellow-green fluorescence in solvents and hydrocarbon oils is obtained with good yield.

Products showing a similar fluorescence are formed when benzanthrone and iron powder are heated with 4'-methyl- or 4'-chlorobenzoyl-2-benzoic acid or mixtures thereof.

Example 8

225 parts of benzanthrone and 75 parts of benzoyl-2-benzene acid are heated with 195 parts of zinc dust to 310° C. for 17 hours. The crude product is extracted and a product with a yellow-green fluorescence in solvents is obtained.

Example 9

20 parts of 1,1'-dianthraquinonyl, 40 parts of benzoyl-2-benzoic acid, 40 parts of benzophenone and 20 parts of iron powder are heated to 310–320° C. for 20 hours. A product which exhibits an olive green fluorescence in solvents and hydrocarbon oils is obtained by the usual extraction.

Example 10

1000 parts of anthraquinone, 250 parts of benzoyl-2-benzoic acid, and 100 parts of benzophenone are heated to 260° C. and 600 parts of iron powder are added slowly at this temperature. The temperature is then raised to 310° and maintained there for about 18 hours. The dark reaction product is poured onto pans and milled after cooling. The red fluorescent compound is separated from the iron residue by extraction with hot solvent naphtha and isolated by steam distilling off the solvent. 662 parts of dry product are obtained. This compound shows a strong red fluorescence when added to organic solvents or hydrocarbon oils in small amounts.

A product showing a similar, but much weaker fluorescence, is obtained when anthraquinone alone is heated with iron powder to 300–360° C.

Example 11

Equal parts of benzanthrone, anthraquinone, benzophenone and iron powder are heated to 305–310° C. for about 22 hours. The black reaction product is discharged into pans, allowed to cool and milled fine. The fluorescent compound is extracted from the iron residue with hot toluene or solvent naphtha. The solvent is removed by steam distillation and 0.9 parts of the combined weight of benzanthrone and anthraquinone are obtained as a reddish brown powder, which shows a yellow-red fluorescence in dilute solutions in organic solvents and hydrocarbon oils. The melting point of the product as obtained is about 140–208° C. It contains 86.33% carbon, 5% hydrogen, and 8.67% oxygen. It contains some unchanged anthraquinone which does not affect its use as a bloom producing agent for hydrocarbon oils. The solution in sulfuric acid is yellow-brown with a strong yellow fluorescence.

Example 12

135 parts of benzanthrone, 60 parts of benzoyl-2-benzoic acid, 5 parts of anthraquinone and 100 parts of iron powder are heated to 300–310° C. for 17 hours. Chlorobenzene is added to the finished fusion at about 160° C. and the bloom agent is extracted. The product shows an olive green fluorescence in solvents and hydrocarbon oils.

*Example 13*

200 parts of benzanthrone, 60 parts of 1,4-dihydroxy-anthraquinone and 100 parts of iron powder are heated to 330° C. for 22 hours. A product with a yellow green bloom is obtained by extraction.

*Example 14*

Equal parts of benzanthrone, 2-chloro-antraquinone and iron are heated in the presence of small amounts of benzophenone to 310° C. for several hours. A product which exhibits a yellow red fluorescence in solvents and oils is obtained by the usual method of isolation.

*Example 15*

150 parts of anthraquinone, 100 parts of abietene, and 50 parts of benzanthrone are heated to 340° C. for 24 hours in the presence of 100 parts of iron powder. A very good yield of a product showing an olive green fluorescence in hydrocarbons is obtained. Similar compounds or compounds showing a slightly redder fluorescence are obtained when benzanthrone, 4'-chloro-benzoyl-2-benzoic acid and iron powder or anthraquinone and iron powder are heated with abietene or with abietane.

*Example 16*

100 parts of benzanthrone, 100 parts of anthraquinone and 100 parts of tin are heated to 310–320° C. in the presence of 50 parts of benzophenone. A compound with a yellow red fluorescence in solvents and oils is obtained by extraction of the crude.

*Example 17*

Equal parts of benzanthrone, anthraquinone and zinc dust are heated to 310° C. for 20 hours, in the presence of some benzophenone. A compound showing the same yellow red fluorescence in solvents is formed as when iron powder instead of zinc dust was used.

*Example 18*

Compounds giving a yellow red to bluish red bloom to hydrocarbons are also formed when benzanthrone and anthanthrone and benzoyl-2-benzoic acid or pyrazolanthrone and benzoyl-2-benzoic acid are heated with reducing metals in the manner described in the preceding examples.

The formation of these compounds becomes noticeable usually during the first hour of heating at temperatures above 290° C. with optimum results being obtained during the first 24 hours. The amount of metal used, we have found, influences to some extent the shade of the bloom which is ultimately obtained from the color compound when dissolved in oil; too small amounts of the metal give dull shades. The time required to complete the reaction is also materially increased when too small an amount of metal is used.

Numerous variations in the processes above described may be made without departing from our invention. The starting materials need not be chemically pure or even technically pure, and mixtures of the compounds mentioned or their isomers may be used. The compounds may be intimately mixed together before heating is commenced, or they may be charged in one after the other at any temperature found to be convenient. Numerous modifications may also be made in the particular methods for isolating the color compounds. High boiling solvents may be added to the molten mass and thus avoid milling of the crude product, or continuous extraction may be employed. Alternatively, the iron or other metal may be removed by digesting the crude fusion product with dilute acids, such as hydrochloric or sulfuric, the water-soluble salts being removed with the solution by filtration.

Analysis of the resulting color compounds indicates that reduction takes place to a greater or lesser degree together with condensation of one or more molecules of the anthraquinone compound.

We claim:

1. The process for preparing color compounds which comprises heating a high molecular cyclic ketone of the class consisting of an anthraquinone, a benzanthrone and an anthanthrone with a reducing metal for an extended period of time at temperatures above 280° C. but below 360° C.

2. Products obtainable by the process of claim 1 which when dissolved in liquid hydrocarbons impart thereto a strong fluorescence ranging in color from blue-green to orange and red shades.

3. The process for preparing color compounds which comprises heating a high molecular cyclic ketone of the class consisting of an anthraquinone, a benzanthrone and an anthanthrone with a reducing metal for an extended period of time at temperatures between 300 and 360° C. under conditions which prevent the escape of any material amount of the reaction products or of those reactants which enter into the formation of the color compounds.

4. Products obtainable by the process of claim 3 which when dissolved in liquid hydrocarbons impart thereto a strong fluorescence ranging in color from blue-green to orange and red shades.

5. The process for preparing color compounds which comprises heating a high molecular cyclic ketone of the class consisting of an anthraquinone, a benzanthrone and an anthanthrone and a high boiling solvent with a reducing metal for an extended period of time at temperatures above 280° C. but below 360° C.

6. Products obtainable by the process of claim 5 which when dissolved in liquid hydrocarbons impart thereto a strong fluorescence ranging in color from blue-green to orange and red shades.

7. The process for preparing color compounds which comprises heating a benzanthrone with an anthraquinone and a reducing metal at temperatures above 280° C. but below 360° C. for an extended period of time.

8. Products obtainable by the process of claim 7 which when dissolved in liquid hydrocarbons impart thereto a strong red fluorescence.

9. The process which comprises heating benzanthrone and a high boiling solvent with a reducing metal for an extended period of time at temperatures between 300 and 360° C. under conditions which prevent the escape of any material amount of the reaction products.

10. Products obtainable by the process of claim 9 which when dissolved in liquid hydrocarbons impart thereto a strong yellow-green fluorescence.

11. The process which comprises heating anthraquinone with a reducing metal for an extended period of time at temperatures between 300 and 360° C., under conditions which prevent the escape of any material amount of the reaction product.

12. Products obtainable by the process of claim 11 which when dissolved in liquid hydrocarbons impart thereto a strong red fluorescence.

13. The brown solid product, capable of imparting green fluorescence to hydrocarbon oils, obtainable by adding 80 parts of iron powder with agitation to 100 parts of benzanthrone at a temperature of 250° C., raising the temperature to 300°–350° C., maintaining it at that level for 20 hours, cooling and extracting with hot benzene.

14. The product obtained by heating 750 parts of benzanthrone and 250 parts of benzoyl-2-benzoic acid to about 250° C., adding slowly 650 parts of iron powder, heating to 320°–330° C. for about 24 hours, cooling and extracting with hot benzene, which product imparts to liquid hydrocarbons a green fluorescence and is capable of oxidation to vat dyes.

JOHN M. TINKER.
VIKTOR M. WEINMAYR.

CERTIFICATE OF CORRECTION.

Patent No. 2,073,662.                                    March 16, 1937.

JOHN M. TINKER, ET AL.

It is hereby certified that error appears in the printed specification of the above numbered patent requiring correction as follows: Page 2, second column, line 19, for "benzene" read benzoic; and that the said Letters Patent should be read with this correction therein that the same may conform to the record of the case in the Patent Office.

Signed and sealed this 1st day of June, A. D. 1937.

Henry Van Arsdale (Seal)                              Acting Commissioner of Patents.